(12) United States Patent
Englehardt et al.

(10) Patent No.: US 9,784,590 B2
(45) Date of Patent: Oct. 10, 2017

(54) VEHICLE NAVIGATION SYSTEM FOR ESTIMATING ENERGY CONSUMPTION OF ROUTE LINKS

(71) Applicant: HARMAN BECKER AUTOMOTIVE SYSTEMS GMBH, Karlsbad (DE)

(72) Inventors: Hans-Peter Englehardt, Unterschleißheim (DE); Sebastian Kluge, München (DE)

(73) Assignee: HARMAN BECKER AUTOMOTIVE SYSTEMS GMBH, Karlsbad-Ittersbach (DE)

(*) Notice: Subject to any disclaimer, the term of this patent is extended or adjusted under 35 U.S.C. 154(b) by 0 days.

(21) Appl. No.: 14/961,804

(22) Filed: Dec. 7, 2015

(65) Prior Publication Data

US 2016/0084665 A1    Mar. 24, 2016

Related U.S. Application Data

(62) Division of application No. 13/228,294, filed on Sep. 8, 2011, now Pat. No. 9,239,243.

(30) Foreign Application Priority Data

Sep. 8, 2010   (EP) .................................... 10175871

(51) Int. Cl.
*G01C 21/34*   (2006.01)
*G06F 17/30*   (2006.01)
(Continued)

(52) U.S. Cl.
CPC ......... *G01C 21/3469* (2013.01); *G01C 21/32* (2013.01); *G06F 17/30241* (2013.01);
(Continued)

(58) Field of Classification Search
CPC ................ G01C 21/3469; G01C 21/32; G06F 17/30241; G06F 17/30; G01F 9/023; G01F 9/001
See application file for complete search history.

(56) References Cited

U.S. PATENT DOCUMENTS 6,085,137 A    7/2000  Aruga et al.
6,278,928 B1   8/2001  Aruga et al.
(Continued)

FOREIGN PATENT DOCUMENTS

JP    10122872 A     5/1998
JP    2001-183150 A  6/2001
(Continued)

OTHER PUBLICATIONS

JP Office Action dated Jan. 19, 2015.
Extended European Search Report for Application No. 10 17 5871, dated Mar. 9, 2011.

*Primary Examiner* — Khoi Tran
*Assistant Examiner* — Majdi Alsomiri
(74) *Attorney, Agent, or Firm* — Artegis Law Group, LLP

(57) ABSTRACT

A vehicle navigation system having a database configured to store map data. The database includes links corresponding to road segments and attributes associated with the links. The map data includes at least some links associated with a curvature attribute. A mean absolute curvature is stored for the curvature attribute for corresponding links. The mean absolute curvature may be determined from a normalized sum or integral of absolute curvature values along the road segment corresponding to the link. The system includes a processing unit configured to estimate an energy consumption of the vehicle for a link using the curvature attribute retrieved from the database for the link.

9 Claims, 5 Drawing Sheets

(51) Int. Cl.
  *G01C 21/32* (2006.01)
  *G01F 9/00* (2006.01)
  *G01F 9/02* (2006.01)
(52) U.S. Cl.
  CPC .............. *G01F 9/001* (2013.01); *G01F 9/023* (2013.01); *G06F 17/30* (2013.01)

(56) References Cited

U.S. PATENT DOCUMENTS

| | | | |
|---|---|---|---|
| 6,377,741 | B1 | 4/2002 | Lentink |
| 6,798,376 | B2 | 9/2004 | Shioda et al. |
| 7,103,460 | B1* | 9/2006 | Breed ................ B60C 23/0408 701/29.1 |
| 7,336,078 | B1* | 2/2008 | Merewether ............ G01V 3/15 324/326 |
| 7,443,154 | B1* | 10/2008 | Merewether ........... G01V 3/104 324/326 |
| 2003/0130779 | A1 | 7/2003 | Shilmado et al. |
| 2004/0049339 | A1 | 3/2004 | Kober et al. |
| 2005/0192727 | A1* | 9/2005 | Shostak ................ B60C 11/24 701/37 |
| 2006/0095195 | A1 | 5/2006 | Nishimura et al. |
| 2006/0212222 | A1 | 9/2006 | Miyoshi et al. |
| 2008/0071472 | A1 | 3/2008 | Yamada |
| 2008/0280625 | A1 | 11/2008 | Larsen |
| 2009/0222198 | A1 | 9/2009 | Raynaud |
| 2009/0319139 | A1 | 12/2009 | Kondou et al. |
| 2014/0350836 | A1* | 11/2014 | Stettner ................ G01S 17/023 701/301 |

FOREIGN PATENT DOCUMENTS

| | | |
|---|---|---|
| JP | 2005091083 A | 4/2005 |
| JP | 2005098749 | 4/2005 |
| JP | 2009-067350 A | 2/2009 |
| JP | 2010052652 A | 3/2010 |
| JP | 2010115100 A | 5/2010 |

* cited by examiner

VEHICLE NAVIGATION SYSTEM FOR ESTIMATING ENERGY CONSUMPTION OF ROUTE LINKS

CROSS-REFERENCE TO RELATED APPLICATIONS

This application is a divisional of the co-pending U.S. patent application titled, "VEHICLE NAVIGATION SYSTEM," filed on Sep. 8, 2011 and having Ser. No. 13/228,294, which claims priority of European patent application titled, "VEHICLE NAVIGATION SYSTEM," filed on Sep. 8, 2010, and having Serial No. 10 175 871.2. The subject matter of these related applications is hereby incorporated herein by reference.

BACKGROUND OF THE INVENTION

1. Field of the Invention

The invention relates to a vehicle navigation system, and more particularly to systems having a database that stores map data and methods for estimating energy consumption of a vehicle for a link of a route.

2. Related Art

Navigation systems are used in vehicles to calculate a route from a present vehicle position to a predetermined destination using map data. Navigation systems typically calculate the fastest or the shortest route to the destination using corresponding cost factors associated with the links of the route. With the costs of energy (such as fuel, gas or electricity) continuing to rise, it is desirable to reach the destination by a route that minimizes the energy consumption.

The determination of an energy efficient route may involve the use of static parameters, such as parameters associated with a speed category or a road size, and dynamic parameters, such as the driving behaviour of the driver of the vehicle. The static and dynamic parameters may be used to indicate characteristics of a link corresponding to a road segment. Although the use of these parameters may provide a good approximation of the energy consumption for a given route, it would be desirable to further improve the accuracy with which energy consumption is estimated.

Advanced driver assistance systems (ADAS) may also be used to provide assistance to the driver of the vehicle. ADAS systems acquire information about the current driving situation or the vehicle's surroundings using sensors. The information is evaluated in order to control various systems or components of the vehicle (such as for example the electronic stability program, or ESP, and the anti-lock brake system, or ABS) or to provide feedback to the driver. Modern assistance systems may combine the use of information retrieved from sensors with static parameters obtained from a database of a navigation system. Such static parameters are generally stored in an ADAS attribute layer of the navigation database. This layer generally corresponds to the lowest map data layer (layer 13), which includes the data generally associated with the shape points of links provided at the lowest layer. In order to retrieve this data, additional access to the ADAS layer is required, resulting in slow access times. The data is associated with shape points and used for a higher level route determination, which uses higher layer links. The use of the ADAS layer data for navigation purposes is thus generally difficult and costly in terms of computing time and computing power. Accordingly, the use of the ADAS layer data for route determination in a navigation system is at least associated with a number of drawbacks.

Accordingly, there is a need for improvements in the determination of an energy efficient route.

SUMMARY

A vehicle navigation system having a database configured to store map data. The database includes links corresponding to road segments and attributes associated with the links. The map data includes at least some links associated with a curvature attribute. A mean absolute curvature ($\bar{\kappa}$) is stored for the curvature attribute for corresponding links. The mean absolute curvature ($\bar{\kappa}$) may be determined from a normalized sum or integral of absolute curvature values along the road segment corresponding to the link. The system includes a processing unit configured to estimate an energy consumption of the vehicle for a link using the curvature attribute retrieved from the database for the link.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by reference to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
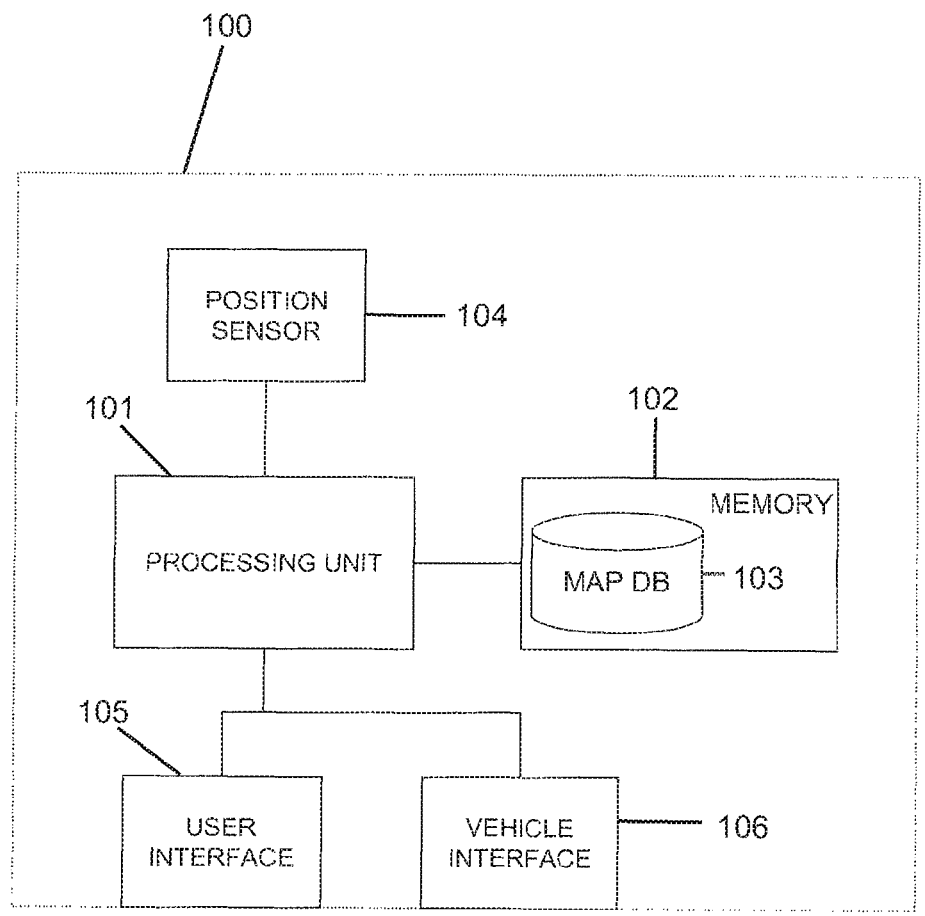
FIG. 1 is a block diagram of an example of a navigation system.

FIG. 1 is a block diagram of an example of a navigation system 100. The navigation system 100 includes a processing unit 101 configured to control the operation of the navigation system 100 according to control instructions stored in memory 102. The processing unit 101 may be a central processing unit, for example, in the form of one or more microprocessors, digital signal processors or application-specific integrated circuits. The memory 102 may be of any suitable memory type, such as random access memory ("RAM"), flash memory or a hard drive. The memory 102 may also include removable storage devices such as a compact disc (CD), a DVD, a memory card or other similar type of device.

The processing unit 101 includes an interface to a position sensor 104 adapted to determine the current position of the vehicle in which navigation system 100 is located. The position sensor 104 may be any suitable position sensor, such as for example, a GPS (Global Positioning System) sensor, a Galileo sensor, a position sensor based on mobile telecommunication networks and other sensors.

The navigation system 100 includes a user interface 105 that may include a display and control elements, such as keys, buttons, rotary knobs and rotary/push knobs provided on a faceplate of the navigation device 100 or in any other suitable location inside the vehicle. The processing unit 101 may obtain information from other vehicle systems. For example, the current vehicle status information may be obtained via a vehicle interface 106. The vehicle interface 106 may include, for example, a CAN (controller area network) interface or a MOST (Media Oriented Systems Transport) interface. Information relating to the driving behavior of the driver of the vehicle, the current user of the vehicle, current operation conditions of the engine, current energy levels (such as for example, the status of batteries or the level of fuel in the fuel tank), and other similar information may be obtained by the processing unit 101 via the vehicle interface 106.

The memory 102 may include a database 103 having map data. The database 103 may be referred to as a navigation database or a map database in this specification. The database 103 may be stored in a storage system or device, such as a hard drive or a flash memory, or on a CD or DVD, or on other storage devices. The map database 103 may include a data representation of a road network of a particular region. The representation may include nodes representing points on a map, such as cities or other settlements, intersections, highway entrances or exits, or points placed along roads. The map database 103 may also include links between these nodes, where a link corresponds to a road segment between two nodes. The links may be provided for different layers corresponding to different map scales. As an example, at a lower layer, a link may be provided between two neighbouring highway entrances, whereas at a higher layer a link may be provided between two adjacent settlements.

Figure 2:
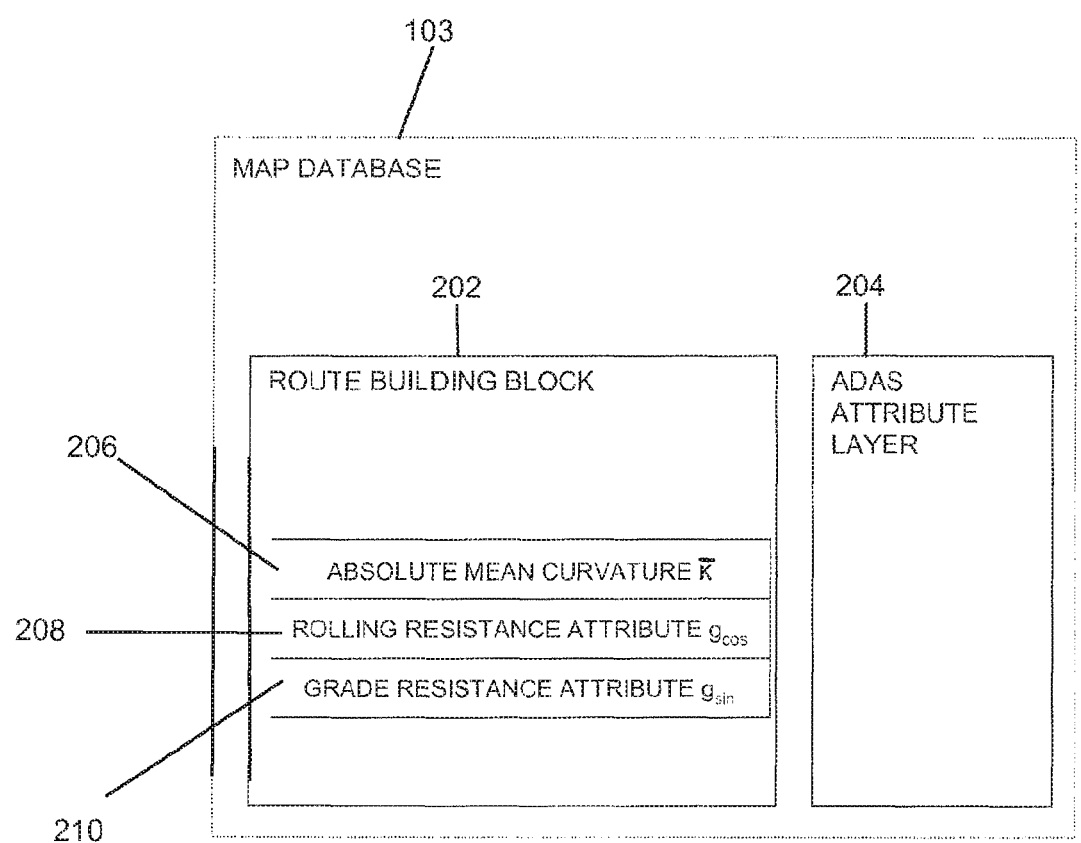
FIG. 2 is a block diagram of an example of a map database that may be used in the example system in FIG. 1.

FIG. 2 is a block diagram of an example of a map database 103 that may be used in the example system 100 in FIG. 1. The map database 103 includes a route building block 202 and an advanced driver assistance system (ADAS) attribute layer 204. The route building block 202 includes static parameters, which are directly associated with a link of the map data of database 103. The static parameters stored in the route building block 202 may include, for example, a functional road class, traffic control system parameters (such as traffic lights, right of way, speed restrictions and other similar parameters), a speed category or average speed for the link, and other static parameters. In an example implementation, the functional road class and average speed parameters may be fixed route building block (RBB) attributes, and the traffic control system information may be a flexible RBB attribute.

The route building block 202 may include a curvature attribute 206, a rolling resistance attribute 208 and a grade resistance attribute 210 in addition to other attributes. Each of a plurality of links of the map data may be associated with a value of each of the attributes. If no attribute value is provided for a link, a default value may be used. Attribute values may also be stored only for the links for which they are provided. When determining a cost factor or energy consumption for the link, the database 103 may be queried for the availability of the attribute for the link. If the attribute is not available, the contribution to the cost factor corresponding to the attribute is neglected. A more compact database may be achieved when links have attributes only when specifically provided attribute values since space is not allocated for empty or default attribute values.

Figure 3:
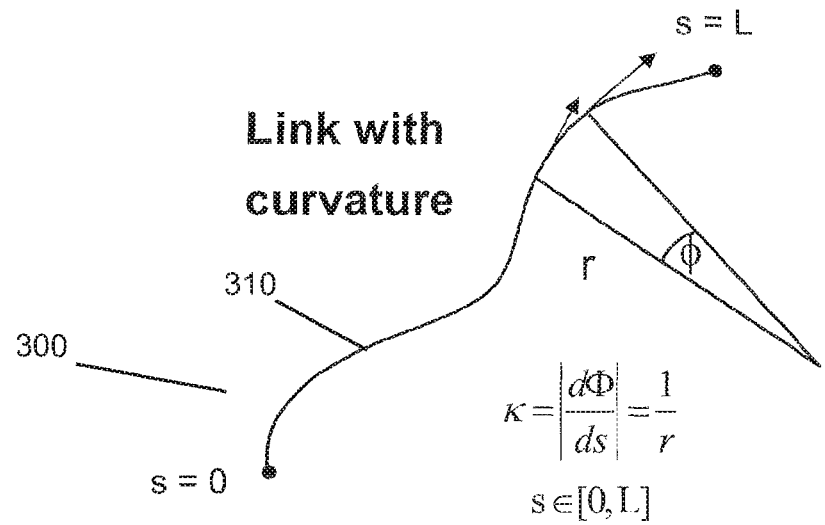
FIG. 3 is a schematic diagram illustrating an example determination of a curvature attribute.

The curvature attribute 206 is provided to store an absolute mean curvature $\bar{\kappa}$ of the road segment corresponding to a link associated with the attribute. The mean absolute curvature for the road segment may be determined as illustrated in FIG. 3. FIG. 3 is a schematic diagram illustrating an example determination of a curvature attribute. FIG. 3 depicts a link 300 that corresponds to a road segment 310 starting at point s=0 and ending at point s=L, where L is the length of the road segment. The road segment 310 has different curvatures along its course, which can be defined at each point s along the course as:

$$\kappa = \left| \frac{d\Phi}{ds} \right| = \frac{1}{r}, \text{ with } s \in [0, L]. \tag{1}$$

In order to determine a curvature value for the entire link 300, the absolute values of curvature $\kappa$ may be integrated along the course of the road segment or, when provided in discrete form, can be summed up and normalized with the length of the road segment 310. The mean absolute curvature $\bar{\kappa}$ may be calculated as follows:

$$\bar{\kappa} = \frac{1}{L} \int_0^L |\kappa(s)| ds. \tag{2}$$

The integration may be performed numerically. In particular, the curvature values may be provided at discrete points along the road segment 310. The road segment 310 may for example be described with discrete points placed along or in proximity to the road segment, and for each of these points, a curvature value can be provided. The mean absolute curvature for the link 300 may then be calculated as a mean of the absolute curvatures provided at each discrete point.

It is also possible to weight the curvature values in the integral or sum when determining the mean absolute curvature, $\bar{\kappa}$. When integrating, the weighting factor may be a continuous function which may itself depend on curvature. High curvatures may have a disproportional influence on the energy consumption and can accordingly be weighted more heavily than lower curvatures. If the mean absolute curvature is determined from discrete curvature values, the function can be used to determine corresponding discrete weighting factors, which may again weight higher curvatures more strongly than lower curvatures.

When determining a route from a starting point to a destination, cost factors are generally provided for the links of the map and the route having the lowest total cost for reaching the destination is selected. The mean absolute curvature can be used for determining a cost factor for a link. It can also be used to estimate the energy required for travelling along the link. The additional required energy $\Delta B$ is generally proportional to the mean absolute curvature $\bar{\kappa}$. For determining the additional energy $\Delta B$ required due to the curvature, a simple model may be implemented using a vehicle-specific curvature coefficient $c_C$, which may be stored in memory 102. The additional fuel consumption may then be determined as:

$$\Delta B = c_C \cdot \overline{\kappa} \quad (3)$$

More complex models may also be employed. A more complex model may for example consider an estimate of the velocity of the vehicle while on the link, which may be a factor in a change in additional energy consumption due to curvature. Other factors include the braking of the vehicle that may be deemed likely in order to maintain vehicle control between curves in different directions such as, for example, a curve to the left going over into a curve to the right. Such braking may result in increased energy usage. The increased energy usage may be factored into the analysis in either the mean absolute curvature, $\overline{\kappa}$, using for example a corresponding weighting factor, or in the model for determining the energy consumption for the link. Storing the mean absolute curvature to correspond to the link provides one value for the link. The additional energy consumption may then be determined directly from this one value.

Figure 4:
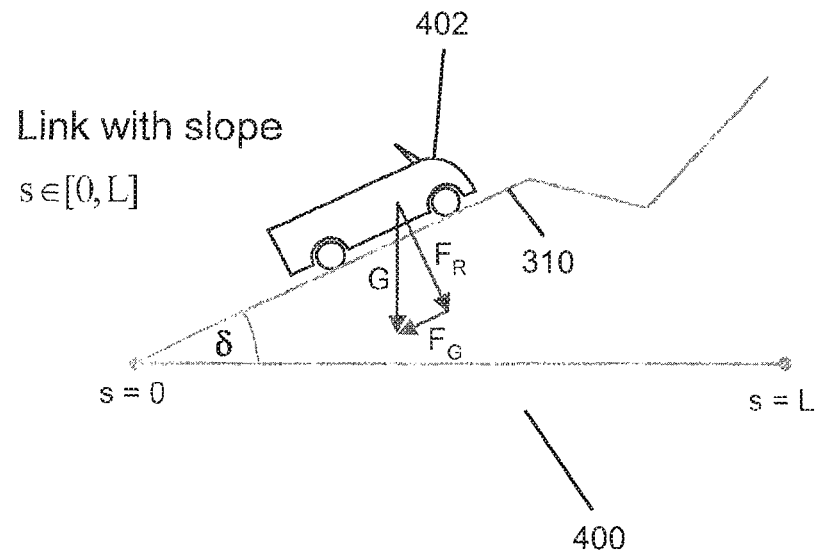
FIG. 4 is a schematic diagram illustrating an example determination of a rolling resistance attribute and a grade resistance attribute.

The route building block section 202 shown in FIG. 2 also includes a rolling resistance attribute 208 and a grade resistance attribute 210 for links having uphill and/or downhill sections. FIG. 4 is a schematic diagram illustrating an example for determining a rolling resistance attribute and a grade resistance attribute. FIG. 4 depicts a link 400 starting at a node s=0 and ending at a node s=L. The corresponding road segment has uphill and downhill sections with corresponding angles of elevation $\delta$ along its course. If the vehicle 402 is travelling along an uphill road section, the force $F_R$ normal to the road decreases, while at the same time the vehicle experiences a grade resistance $F_G$ as illustrated by the arrows. Force G is the gravitational force G=m·g, where m is the mass of the vehicle and g is the gravitational acceleration. The rolling resistance of the vehicle is generally proportional to the normal force $F_R$. The additional energy consumption $\Delta B$ due to the incline of the road may be expressed as:

$$\Delta B \sim \int_0^L (F_R(s) + F_0(s)) ds \quad (4)$$

A rolling resistance coefficient $C_R$ and the grade resistance coefficient $c_G$ may be defined for the vehicle. The additional fuel consumption may be expressed as:

$$\Delta B = \int_0^L (c_R \cdot f(\delta(s)) \cdot \cos(\delta(s)) + c_G \cdot g(\delta(s)) \cdot \sin(\delta(s))) ds \quad (5)$$

The $c_R$ and $c_G$ are generally vehicle-dependent. The weighting factors $f(\delta(s))$ and $g(\delta(s))$ are not vehicle-dependent, but can be made to be vehicle-independent. The weighting coefficients $f(\delta(s))$ and $g(\delta(s))$ may also be based on the type of vehicle. The performance of the vehicle with regards to energy consumption when travelling uphill or downhill may be modelled by using these weighting coefficients, $f(\delta(s))$ and $g(\delta(s))$. As shown in FIG. 4, the cos $\delta$ corresponds to the ratio of the normal force to the gravitational force, whereas the sin $\delta$ corresponds to the ratio of the grade resistance to the gravitational force. The gravitational force, which is vehicle-specific (G=mg), is accounted for in the vehicle-specific coefficients in equation 5.

From the above equation, a rolling resistance attribute and a grade resistance attribute may be determined from equations 6 and 7, respectively:

$$g_{cos} = \int_0^L f(\delta(s)) \cdot \cos(\delta(s)) ds \quad (6)$$

$$g_{sin} = \int_0^L g(\delta(s)) \cdot \sin(\delta(s)) ds \quad (7)$$

These rolling resistance attribute 208 and the grade resistance attribute and 210 as shown in FIG. 2 may be stored in the map database 103 associated with a link as a data element or sub-element of a data structure defining the link, or via some other form of association available via the map database 103. The attributes 208, 210 may also be made vehicle-independent.

The attributes, curvature attribute 206, rolling resistance attribute 208 and the grade resistance attribute 210, may be associated with a single link as shown in map database 103 in FIG. 2 where the link has curvature and incline/decline characteristics. A link having only curvature characteristics may include only curvature attributes 206 of the three. Similarly, a link having only incline/decline characteristics may include only the rolling resistance attribute 208 and the grade resistance attribute and 210, of the three.

If the weighting factor is chosen to be a constant, as in for example, $g(\delta(s))=1$, or is vehicle independent, then equation 5 may not accurately yield the desired results. For example, a link may have the starting point and the end point at the same elevation, yet include sections in-between that are at a higher or lower elevation. Referring to equation 5, the integral over sin ($\delta$) may yield a value of zero despite the consumption of additional energy while on the incline and decline portions of the link. Such a result would only be valid if the vehicle regains all energy consumed during uphill driving when driving downhill, which is clearly not possible, at least for gasoline powered vehicles. Some vehicles, such as vehicles equipped with conventional combustion engines, consume energy when driving uphill and downhill, while other vehicle, such as hybrid vehicles or electric vehicles, may regain part of the consumed energy when travelling downhill.

With a constant or vehicle independent weighting factor, two values may be provided in the grade resistance attribute. For example, the term $g_{sin+}$ may be defined as the sum or integral over the length of the link over the sine of all positive angles of elevations. The term $g_{sin-}$ may also be defined as the sum or integral over the sine of all negative angles of elevation. The uphill and downhill sections of the link may thus be considered separately when estimating the additional energy consumption for the link on the basis of the grade resistance attribute. For a combustion engine powered vehicle, a larger $c_G$ may be used for determining $\Delta B$ from $g_{sin+}$, while a negative and smaller coefficient $c_G$ may be used for determining $\Delta B$ from $g_{sin-}$ (downhill sections). The model accounts for fuel consumption both on uphill and downhill sections. For hybrid or electric vehicles, the coefficient $c_G$ for the downhill sections $g_{sin-}$ may be positive and smaller, corresponding to a generated fraction of the energy.

Other ways of determining the grade resistance attribute $g_{sin}$ may also be used. For example, the weighting factor $g(\delta(s))$ may be a triangular function having weighting for the sine term in accordance with the type of vehicle used. It is also possible to provide a vehicle-specific $g(\delta(s))$ that precisely models the additional energy consumption or regained energy when driving uphill or downhill, respectively. In such applications, the map database 103 may be provided as a vehicle-specific map database.

It is noted that the attribute values may be either calculated by integration if the angle $\delta$ is provided as a continuous function of the distance s over the link, or by summation if discrete values of $\delta$ are provided at discrete points s along the road segment. The angle $\delta(s)$ may for example be the angle of elevation provided at particular discrete points along the road segment. When using a discrete sum, corresponding weighting factors may be determined by using the discrete values for $\delta(s)$ in the weighting factor functions $g(\delta(s))$ and $f(\delta(s))$.

The map database 103 in an example implementation may be configured as follows. For some of the links of the map data, information relating to curvature and angles of elevation may be available, for example by association with discrete points or shape points. The information may also be provided by a data source, such as for example, a map data provider or publisher. For the links having such information available, the corresponding attributes, curvature attribute 206, rolling resistance attribute 208 and the grade resistance attribute 210, may be determined as described above. The determined attributes may then be stored as associated with the corresponding link in a route building block such as, for example, the route building block 202 of the database 103 in FIG. 2. If the information for determining one or more of these attributes is not available for a link, then a default value may be stored for the respective attribute for the link in the database 103. The attributes may then be stored as flexible attributes, enabling the use of default values and, if enabled, later modification. The attributes may also be defined as optional in a record for links in the database. This precludes the need to use an attribute placeholder that may be empty for the majority of the links, and storage space may be saved. Alternatively, the attributes may be stored as part of the link class for the respective link. The attributes are then present in every link element.

If a link corresponds to a road segment which has both a steep incline and high curvatures in both directions, for example, the determination of an estimate of the energy consumption based on the attributes described above may not be as precise as desired. The database may then be configured to include links that may be split up into link segments, each having a predetermined size. The link segments will have fewer curves, or fewer uphill/downhill sections. For each of the link segments, the curvature, rolling resistance and/or drag resistance attributes may be determined as described above with respect to the full links. The link segments may be stored in the database as an individual link having the attribute(s) determined for the respective link segment associated with it. These new and smaller links and their attributes may then be considered in determining a route or the estimation of an energy consumption.

Storing the attributes in the route building block 202 in FIG. 2 provides access to the attributes together with other attributes for the link when the link is retrieved from the database. For example, this access to the attributes precludes the need to extract road segment properties stored in association with shape points in the ADAS attribute layer 204 and then use the properties in further calculations. The access to the attributes in the route building block 202 may thus result in increased processing speed.

The attributes, curvature attribute 206, rolling resistance attribute 208 and the grade resistance attribute 210, may be stored in association with the links of the lowest layer of the map data, such as for example layer 13. The attributes may then be easily abstracted from lower layers to higher layers using the following equation:

$$x_{higher\ layer} = \frac{\sum_{m=1}^{M} (x_n \cdot L_n)_{lower\ layer}}{L_{higher\ layer}} \quad (8)$$

The number M is the number of lower layer links that are summarized into the corresponding higher layer link. The term $L_{higher/lower\ layer}$ is the link length of the higher/lower layer link. The term $x_n$ is the respective attribute:

$$x \in \{\overline{\kappa}, g_{cos}, g_{sin\ \square}\}. \quad (9)$$

If the grade resistance attribute includes values for positive and negative angles of elevation, the term $x_n$ becomes the respective attribute:

$$x \in [\overline{\kappa}, g_{cos}, g_{sin+}, g_{sin-}] \quad (10)$$

Determining an attribute for a higher layer link is thus simplified, which may result in performance enhancement. Higher layer links quite frequently correspond to road segments having a number of curves in both directions and having uphill and downhill sections. Using the attributes $x_n$ for estimating energy consumption for the link simplifies the process.

In another example implementation, the attributes $x_n$ may be stored for the links of each layer. This would require more storage space, but may preclude the need for an abstraction of the attributes from lower to higher layers.

The processing unit 101 of vehicle navigation system 100 may retrieve the attributes mentioned above from the map database 103 and use these attributes for different purposes. For example, the attributes may be used to improve the determination of an estimate of the energy consumption for a particular link. This may be used to estimate the total energy consumption required for travelling a particular route, or to estimate the remaining distance that can be travelled with the energy reserves available in the vehicle. The processing unit 101 may also retrieve the current charging status of batteries of the vehicle or the current fuel level in the tank of a vehicle via the vehicle interface 106 in FIG. 1.

The processing unit 101 may also estimate the energy consumption for the link in order to determine a cost factor for the link. The processing unit 101 may use such cost factors to determine a route from a starting point to a destination that minimizes the required energy consumption. Route determination may be performed using any suitable method known in the art. For example, route determination may involve the use of algorithms such as the A* or Dijkstra search algorithm.

Figure 5:
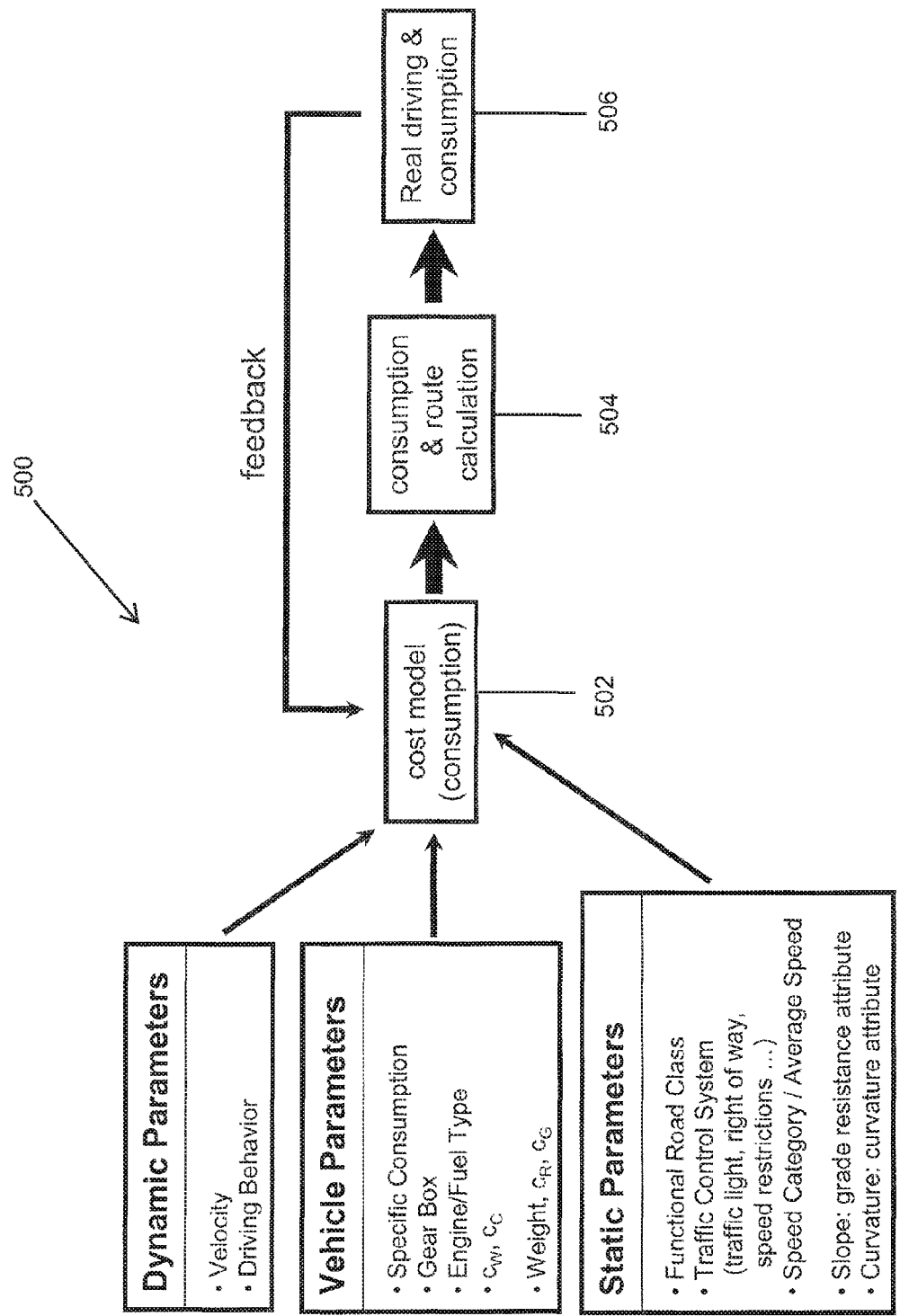
FIG. 5 is a flowchart illustrating an example method for determining cost factors for links in map data.

FIG. 5 is a flowchart illustrating an example method for determining cost factors for links in map data and for determining a route. As shown in FIG. 5, a cost model based on energy consumption is applied at functional block 502. The cost model may use:
1. dynamic parameters, such as the vehicle velocity and the driving behavior;
2. vehicle parameters, such as the specific fuel consumption, the gear ratios used, the engine type and fuel type;
3. coefficients such as the drag coefficient $c_W$, and the above mentioned curvature coefficient $c_C$; and
4. parameters based on the vehicle weight, such as the rolling resistance coefficient $c_R$ and the grade resistance coefficient $c_G$.

The static parameters provided by the map database 103 may also be used for determining the cost for a particular link with the cost model. Such static parameters may include:
1. the functional route class,
2. traffic control system related parameters such as traffic lights, right of way, speed restrictions and other similar parameters,
3. speed category and
4. average speed parameters for the link.

The grade resistance attribute and the curvature attribute may also be used in the cost model for estimating the energy consumption/cost of the link.

Figure 6:
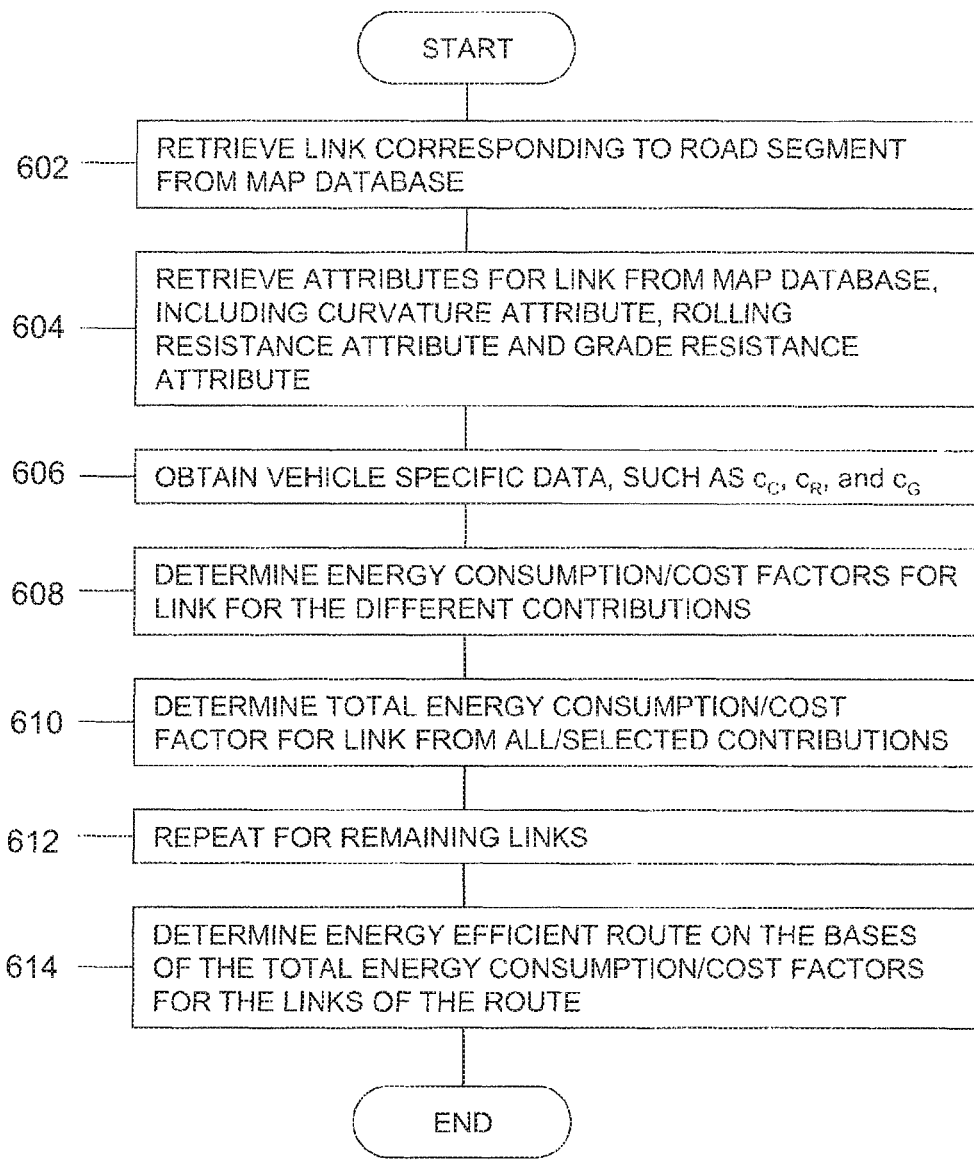
FIG. 6 is a flowchart illustrating operation of an example method for determining a route based on energy efficiency factors.

FIG. 6 is a flowchart illustrating operation of an example method for determining a route based on energy efficiency factors. The method illustrated in FIG. 6 may be performed using the system shown in FIG. 1. The example method may be started as a function performed in determining a route when a driver has entered a starting and destination location. In determining a route, the system analyses road segments and the links that make up the road segments. The system may begin by determining the links to be analysed for alternative routes, or for a single route.

In step 602, the data corresponding to a link in a road segment is retrieved from the map database 103 (in FIG. 1). In step 604, the attributes for the link are retrieved from the map database. The link may contain attributes that include the curvature attribute, the rolling resistance attribute and the grade resistance attribute. The vehicle parameters $c_C$, $c_R$ and $c_G$ may also be retrieved as indicated in step 606. These parameters may also be stored in memory 102, or they may be obtained from other vehicle systems, via vehicle interface 106 for example. An energy consumption (or cost factor) is determined for the link in step 608 for each of the different energy consumption factors (slope, curvature, rolling resistance, aerodynamic drag, for example) relevant to the link. In some instances, only the most important contributions may be considered, such as for example, grade resistance when travelling up a hill. In other implementations, all contributions may be considered. The energy consumption may be determined for example using equations 3, 4, and 5, or derivations thereof. In step 610, the total energy consumption or cost factor is determined for the link from all contributions or from the selected contributions.

The above steps 602-610 is repeated at step 612 for the remaining links, so that total cost factors are available for all links relevant to the route determination. It is noted that for some links, not all attributes are provided in the map database and that accordingly, the corresponding factors are either neglected or default values are used. An energy efficient route can be determined in step 614 using the links associated with the total cost factors.

Referring back to FIG. 5, the energy consumption and route calculation are illustrated in functional block 504. When the driver is travelling along the determined energy efficient route, the navigation system may monitor the real driving conditions energy and consumption as illustrated in functional block 506. This can be compared with the predicted energy consumption, and feedback can be provided for the cost model. As an example, weighting factors of the cost model may be adjusted. On the other hand, it is also possible to adjust vehicle parameters, such as the specific consumption, or dynamic parameters, such as the driving behaviour.

With these measures, energy consumption for particular links can be precisely calculated, and accordingly, the determination of an energy efficient route may be improved. It is noted that it is not necessary to calculate the energy consumption in actual physical terms, that is, for example in liters of fuel for a particular link, or ampere hours of electrical energy for a particular link. It is sufficient to provide a value proportional and representative of the energy consumption, which can be used as a cost factor.

It will be understood, and is appreciated by persons skilled in the art, that one or more processes, sub-processes, or process steps described in connection with FIGS. 1-6 may be performed by hardware and/or software. If the process is performed by software, the software may reside in software memory (not shown) in a suitable electronic processing component or system such as, one or more of the functional components or modules schematically depicted in FIGS. 1-6. The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any means that may contain, store or communicate the program for use by or in connection with the instruction execution system, apparatus, or device. The computer readable medium may selectively be, for example, but is not limited to, an electronic, magnetic, optical, electromagnetic, infrared, or semiconductor system, apparatus or device. More specific examples, but nonetheless a non-exhaustive list, of computer-readable media would include the following: a portable computer diskette (magnetic), a RAM (electronic), a read-only memory "ROM" (electronic), an erasable programmable read-only memory (EPROM or Flash memory) (electronic) and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A vehicle navigation system, comprising:
   a database configured to store map data having links corresponding to road segments and attributes associated with the links, the map data having at least some links associated with a rolling resistance attribute and a grade resistance attribute, the rolling resistance attribute for a link having a rolling resistance attribute value ($g_{cos}$) proportional to a sum or an integral over the cosine of the angles of elevation ($\delta$) along the road segment, the grade resistance attribute for a link having a grade resistance attribute value ($g_{sin}$) proportional to a sum or an integral over the sine of the angles of elevation ($\delta$) along the road segment;
   a processing unit configured to estimate an energy consumption of the vehicle for a link using at least one of the rolling resistance attribute and the grade resistance attribute retrieved from the database for the link,
   wherein the sum or integral are a weighted sum or a weighted integral, respectively, in which the cosine or sine are weighted with a weighting factor depending on the angle of elevation ($\delta$), wherein a vehicle dependent grade resistance coefficient $c_G$ is used to weight the grade resistance attribute which is positive for positive angles of elevation, and for negative angles of elevation the grade resistance coefficient depends on whether the vehicle is a combustion engine powered vehicle or a hybrid or electric vehicle.

2. The vehicle navigation system of claim 1, where the weighting factor for at least the grade resistance attribute is such that the sine is weighted with a positive value if the angle of elevation is positive and with a negative value if the angle of elevation is negative.

3. The vehicle navigation system of claim 1, where the weighting factor for at least the grade resistance attribute is determined by a triangular function depending on the angle of elevation ($\delta$).

4. The vehicle navigation system of claim 1, where the weighting factor for at least the grade resistance attribute is a vehicle specific weighting factor depending on the properties of the vehicle and the angle of elevation ($\delta$).

5. The vehicle navigation system of claim 1, where the grade resistance attribute includes a first value (g sin+) proportional to a sum or an integral over the sine of the positive angles of elevation along the road segment and a second value (g sin−) proportional to a sum or an integral over the sine of the negative angles of elevation along the road segment.

6. The vehicle navigation system of claim 1, where the attribute is stored in a route building block of the database.

7. A method of estimating an energy consumption of a vehicle for a link of a route, the method comprising:
retrieving at least one link corresponding to a road segment from a database of map data;
retrieving at least one of a rolling resistance attribute and a grade resistance attribute associated with the retrieved link from the database, the rolling resistance attribute for a link storing a value ($g_{cos}$) proportional to a sum or an integral over the cosine of the angles of elevation along the road segment, the grade resistance attribute for a link storing a value ($g_{sin}$) proportional to a sum or an integral over the sine of the angles of elevation along the road segment; and
estimating an energy consumption of the vehicle for the link using the retrieved rolling resistance attribute or grade resistance attribute,
wherein the sum or integral are a weighted sum or a weighted integral, respectively, in which the cosine or sine are weighted with a weighting factor depending on the angle of elevation, wherein a vehicle dependent grade resistance coefficient $c_G$ is used to weight the grade resistance attribute which is positive for positive angles of elevation, and for negative angles of elevation the grade resistance coefficient depends on whether the vehicle is a combustion engine powered vehicle or a hybrid or electric vehicle.

8. A vehicle navigation system comprising:
a processing unit;
a database of map data having links corresponding to road segments and attributes associated with the links, the map data having at least some links associated with a rolling resistance attribute and a grade resistance attribute; and
a memory for storing software components configured to perform, when executed by the processor, the following:
retrieving at least one link corresponding to a road segment from the database of map data;
retrieving at least one of a rolling resistance attribute and a grade resistance attribute associated with the retrieved link from the database, the rolling resistance attribute for a link storing a value ($g_{cos}$) proportional to a sum or an integral over the cosine of the angles of elevation along the road segment, the grade resistance attribute for a link storing a value ($g_{sin}$) proportional to a sum or an integral over the sine of the angles of elevation along the road segment; and
estimating an energy consumption of the vehicle for the link using the retrieved rolling resistance attribute or grade resistance attribute,
wherein the sum or integral are a weighted sum or a weighted integral, respectively, in which the cosine or sine are weighted with a weighting factor depending on the angle of elevation, wherein a vehicle dependent grade resistance coefficient $c_G$ is used to weight the grade resistance attribute which is positive for positive angles of elevation, and for negative angles of elevation the grade resistance coefficient depends on whether the vehicle is a combustion engine powered vehicle or a hybrid or electric vehicle.

9. A Non-Transitory computer-readable storage medium having computer programs configured to perform, when executed by a processor, the following:
retrieving at least one link corresponding to a road segment from a database of map data having links corresponding to road segments and attributes associated with the links, the map data having at least some links associated with a rolling resistance attribute and a grade resistance attribute;
retrieving at least one of a rolling resistance attribute and a grade resistance attribute associated with the retrieved link from the database, the rolling resistance attribute for a link storing a value ($g_{cos}$) proportional to a sum or an integral over the cosine of the angles of elevation along the road segment, the grade resistance attribute for a link storing a value ($g_{sin}$) proportional to a sum or an integral over the sine of the angles of elevation along the road segment; and
estimating an energy consumption of the vehicle for the link using the retrieved rolling resistance attribute or grade resistance attribute,
wherein the sum or integral are a weighted sum or a weighted integral, respectively, in which the cosine or sine are weighted with a weighting factor depending on the angle of elevation, wherein a vehicle dependent grade resistance coefficient $c_G$ is used to weight the grade resistance attribute which is positive for positive angles of elevation, and for negative angles of elevation the grade resistance coefficient depends on whether the vehicle is a combustion engine powered vehicle or a hybrid or electric vehicle.

* * * * *